United States Patent
Huang et al.

(10) Patent No.: US 7,088,359 B2
(45) Date of Patent: Aug. 8, 2006

(54) VERTEX REORDERING IN 3D GRAPHICS

(75) Inventors: Hsilin Huang, Milpitas, CA (US); Jeff Jiao, San Jose, CA (US); Chiente Ho, Santa Clara, CA (US)

(73) Assignee: VIA Technologies, Inc. (TW)

( * ) Notice: Subject to any disclaimer, the term of this patent is extended or adjusted under 35 U.S.C. 154(b) by 269 days.

(21) Appl. No.: 10/422,406

(22) Filed: Apr. 23, 2003

(65) Prior Publication Data

US 2004/0212611 A1    Oct. 28, 2004

(51) Int. Cl.
G06T 17/00    (2006.01)

(52) U.S. Cl. ...................... 345/419; 345/619
(58) Field of Classification Search ........ 345/418–421, 345/426, 428, 619–620
See application file for complete search history.

(56) References Cited

U.S. PATENT DOCUMENTS

| 5,710,879 A  | * | 1/1998 | Ashburn ..................... 345/441 |
| 6,518,965 B1 | * | 2/2003 | Dye et al. .................. 345/419 |
| 6,731,294 B1 | * | 5/2004 | Mang et al. ................ 345/556 |

* cited by examiner

*Primary Examiner*—Matthew C. Bella
*Assistant Examiner*—Cliff N. Vo
(74) *Attorney, Agent, or Firm*—Anthony B. Diepenbrock, III; Dechert LLP (57) ABSTRACT

A method and apparatus for reordering the vertices of a graphics primitive. The vertices of the primitive are received in a circular order, but the position of the vertices in the circular order is arbitrary. The vertices include coordinates with respect to an origin. Comparison logic operates on the coordinates of each vertex to determine which vertex is the minimum vertex, which the vertex that is a minimum distance away from the origin. Once the minimum vertex is known, the vertices are shuffled into the proper order, with the minimum vertex in the lowest order position, the next vertex in circular order in the next position and so on. An apparatus saves the information for reordering the vertices, so that the order is preserved for parameter information for each vertex.

15 Claims, 9 Drawing Sheets

VERTEX REORDERING IN 3D GRAPHICS

FIELD OF THE INVENTION

The present invention relates generally to processing graphics primitives and more particularly to maintaining the ordering of vertices of those primitives during processing.

DESCRIPTION OF THE RELATED ART

In a 3D graphics application, redrawing a graphics primitive should always achieve the same result in appearance, despite how the primitive is drawn. However, because of the finite precision of floating point calculations used in 3D applications, if primitive is drawn a second time in a slightly different way, differences in appearance may show up. One difference that may show up involves the depth values of the primitive. To avoid the differences that may show up when a graphics primitive is drawn in slightly different way is desirable.

BRIEF SUMMARY OF THE INVENTION

The present invention is directed towards an apparatus and method that avoids differences in drawing a graphics primitive, regardless of the order in which its vertices are presented.

A method of reordering vertices of a graphics primitive, in accordance with the present invention includes (i) receiving a plurality of vertices of a graphics primitive, where the vertices having a circular ordering, an unknown position in the circular ordering and include coordinates with respect to a predefined origin, (ii) determining which of the vertices of the primitive is closest to the origin, the closest vertex being designated the minimum vertex, (iii) moving the minimum vertex to a first predefined position in the circular ordering, and (iv) for each next vertex in the circular ordering, moving the next vertex to a next predefined position in the circular ordering so that the vertices of the primitive have a prescribed ordering regardless of the order received.

An apparatus for reordering vertices of a graphics primitive in accordance with the present invention includes a graphics primitive storage block, a comparison logic block, a plurality of multiplexers, and a control logic block. The graphics primitive storage block is configured to store a plurality of vertices of a graphics primitive, the vertices in the storage block having a circular ordering, each vertex having an unknown position in the circular ordering and including coordinates with respect to a predefined origin. The comparison logic block is connected to receive the vertices stored in the graphics primitive storage block and configured to determine which of the vertices of the primitive is closest to the origin, the closest vertex being designated the minimum vertex, and to generate a swap_order bit field that contains instructions for reordering the vertices to prescribed positions in the circular ordering based on the determined minimum vertex. Each of the plurality of multiplexers is connected to receive the plurality of vertices stored in the storage block, where each multiplexer is operative to select one of the plurality of vertices based on the swap_order bit field, such that the plurality of multiplexers provides on its output the reordered vertices of the primitive. The control logic block is connected to the comparison logic block and configured to receive the swap_order bit field, where a header signal indicates when the coordinates of the vertices are available from the storage block, and to distribute the swap_order bit field to the plurality of multiplexers to control the selection by the multiplexers.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

Figure 1:
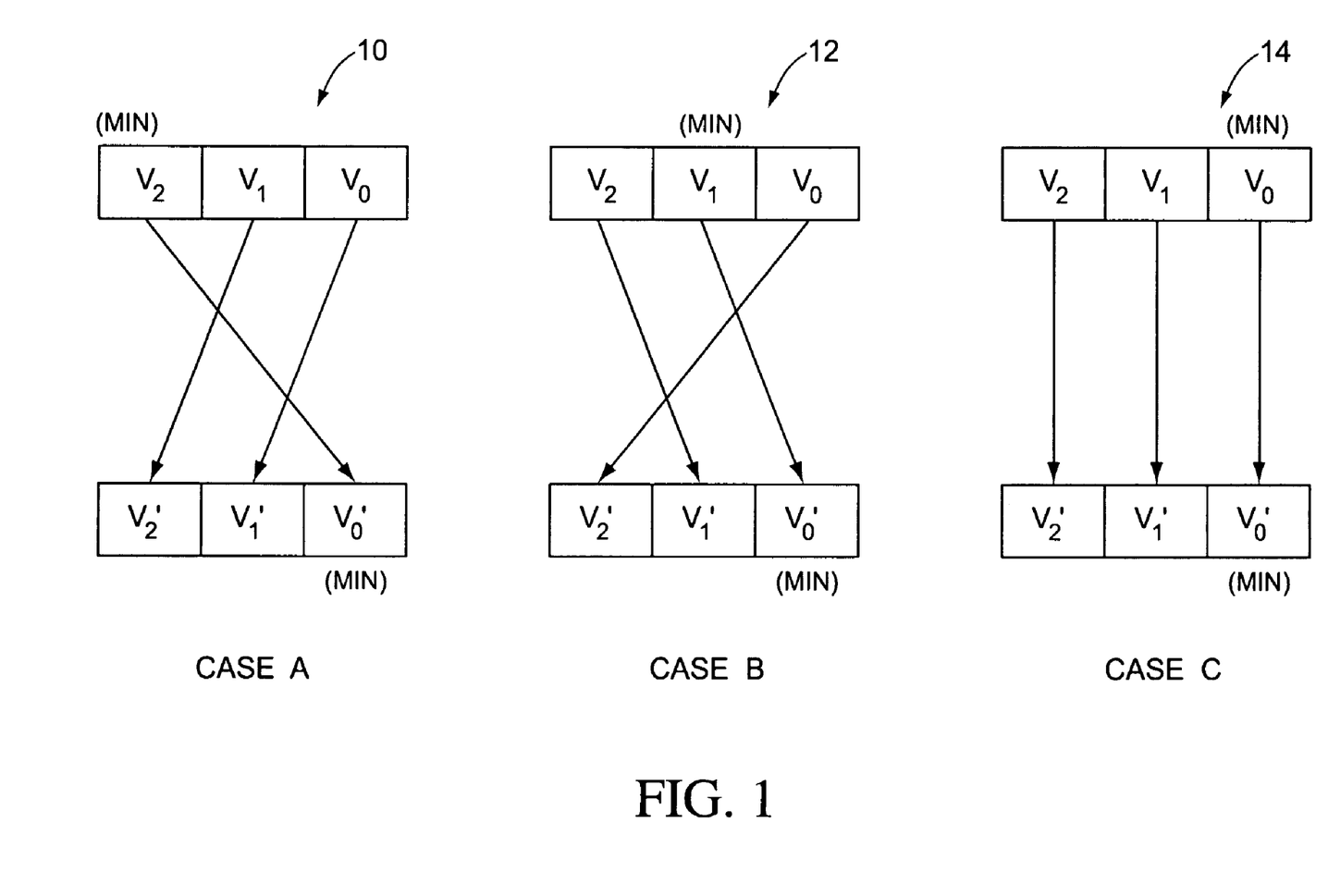
FIG. 1 shows the various reorderings of vertices in accordance with the present invention.

When a graphics primitive is received for processing, the order of its vertices may be arbitrary. To avoid differences in rendering the primitive, the vertices must be reordered so that the order matches a pre-established convention. The convention, for a triangle as the primitive, is that vertex 0 v0 is the vertex closest to an origin, vertex 1 v1 is the next counter-clockwise vertex and vertex 2 v2 is the next counter-clockwise vertex. Thus, if a triangle is received with a vertex ordering of (v2, v1, v0) and v2 is the minimum vertex as shown in FIG. 1, case A 10, then the vertices must be reordered by the following assignments, v0'=v2, v1'=v0, v2'=v1, using primes for the new ordering. If a triangle is received with a vertex ordering of (v2, v1, v0) and v1 is the minimum vertex case B 12, the vertices must be reordered by the following assignments, v0'=v1, v1'=v2, v2'=v0. Finally, if the vertices have the order of (v2, v1, v0) and v0 is the minimum vertex, case C 14, no reordering is needed, i.e., v0'=v0, v1'=v1, v2'=v2.

In order to carry out this process, some information is needed to determine which vertex is the minimum vertex. One way to determine this is to calculate the distance of each vertex to the origin and compare the results. However, this calculation is relatively complex and time consuming and an alternative is desired. The alternative instead computes the following function:

$$\mathrm{Min}\{\max(|x0|,|y0|),\max(|x1|,|y1|),\max(|x2|,|y2|)\}.$$

Figure 2:
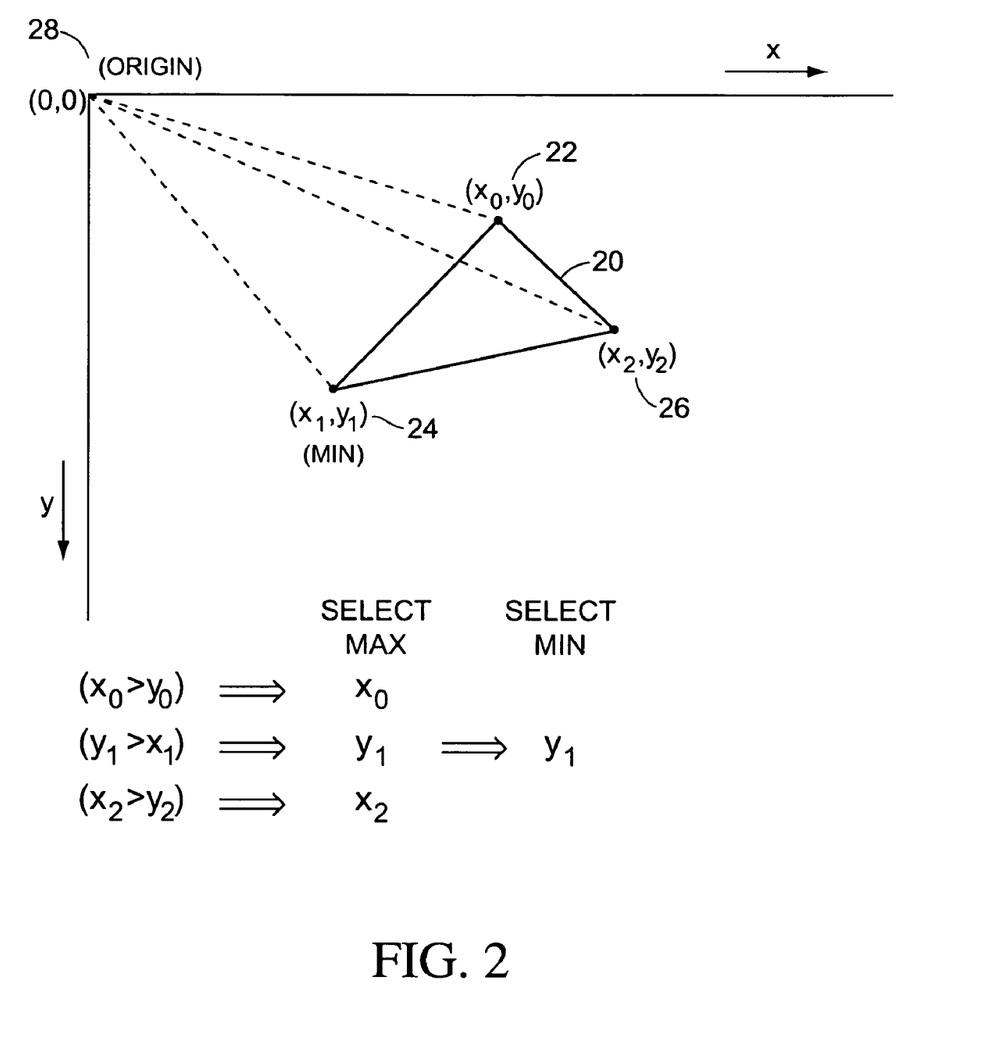
FIG. 2 sets forth an example of a triangle in which (x1, y1) is the minimum vertex.
Figure 3:
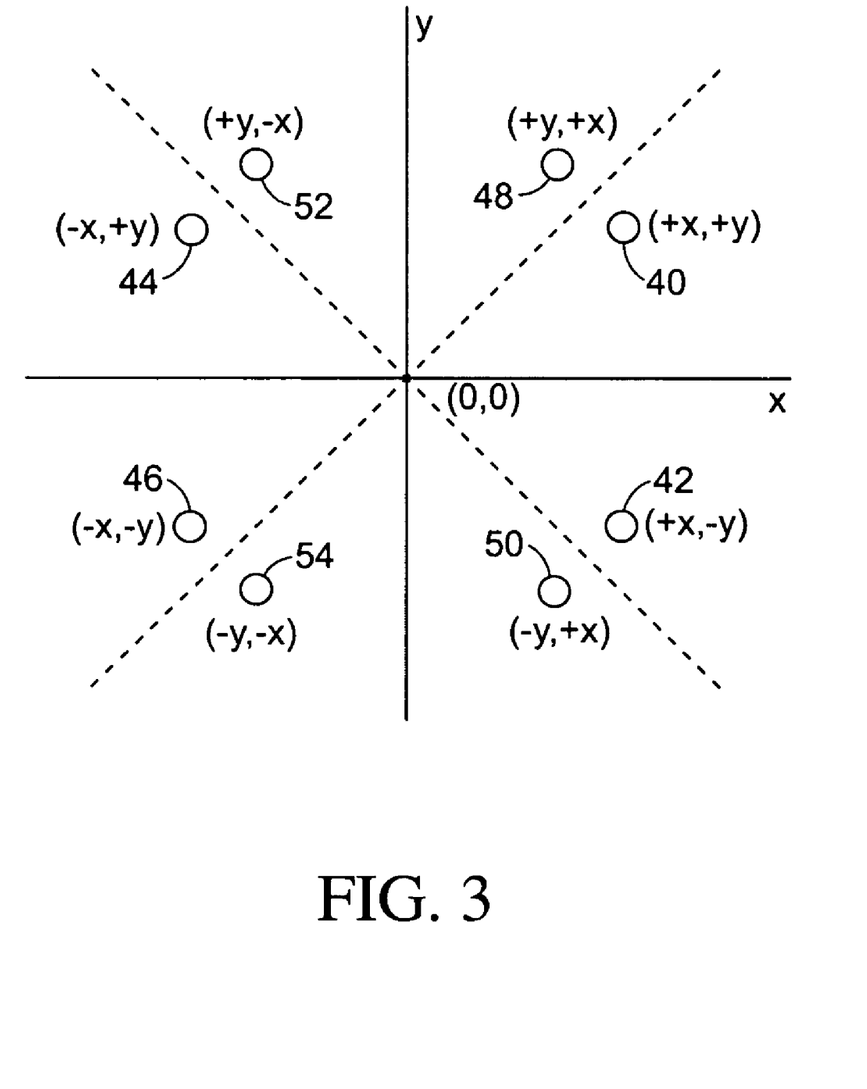
FIG. 3 shows the eight positions possible for each vertex.

In this function, the absolute values of each coordinate of each vertex is taken, the largest coordinate of the pair is selected, and the smallest of those is then selected. The result is a determination of which vertex is closest to the origin 28. FIG. 2 sets forth an example of a triangle 20 in which |x0|>|y0|, |y1|>|x1|, and |x2|>|y2| for the three vertices 22, 24, 26 shown. This means that x0, y1 and x2 are chosen in the max step. Then, the smallest among these is chosen which is clearly y1. Therefore, the vertex closest to the origin is the v1 (x1, y1) vertex. However, because of the use of absolute values and no distinction about of which coordinate is the largest in the max function, the determination is not unique. There are eight cases for each vertex from which one must be determined. Four cases 40, 42, 44, 46 arise because of the absolute value and four more cases 48, 50, 52, 54 arise because the max function does not distinguish an x-coordinate from a y-coordinate. FIG. 3 shows the eight cases 40–54 for each vertex. To find out which of the eight cases for each vertex is the correct case, three more bits are needed for each vertex.

To derive these three bits, the sign of the each coordinate (there are six) must be known. Second, the truth or falsity of each comparison (there are three) performed in the max function must be known. Third, the truth or falsity each comparison (there are three) performed in the min function must be known. This information can be assembled into three bits and used to determine the unique solution to the above function.

The Booleans for the signs are:
sgn_x0 sgn_y0 (2 bits)
sgn_x1 sgn_y1 (2 bits)
sgn_x2 sgn_y2 (2 bits)

The Booleans for the comparisons in the max function are:

$$x0\_lt\_y0=(|x0|<|y0|)(1 \text{ bit})$$

$$x1\_lt\_y1=(|x1|<|y1|)(1 \text{ bit})$$

$$x2\_lt\_y2=(|x2|<|y2|)(1 \text{ bit})$$

The selection functions used in the max function are:

$$v0\_max=(|x0|<|y0|)?|y0|:|x0|$$

$$v1\_max=(|x1|<|y1|)?|y1|:|x1|$$

$$v2\_max=(|x2|<|y2|)?|y2|:|x2|$$

The above information is assembled into the following concatenations, which gives the selected coordinate for each vertex and the three bits to make it unique.

$$v0\_max\_p=(v0\_max, x0\_lt\_y0, sgn\_x0, sgn\_y0)$$

$$v1\_max\_p=(v1\_max, x1\_lt\_y1, sgn\_x1, sgn\_y1)$$

$$v2\_max\_p=(v2\_max, x2\_lt\_y2, sgn\_x2, sgn\_y2)$$

This enables the comparisons needed for the min function to be performed.

$$v0\_lt\_v1=(v0\_max\_p<v1\_max\_p)$$

$$v1\_lt\_v2=(v1\_max\_p<v2\_max\_p)$$

$$v2\_lt\_v0=(v2\_max\_p<v0\_max\_p)$$

The following algorithm assumes that the vertices are received in the order (v2, v1, v0) and performs any reordering necessary to place the vertices in the proper order.

if (~v1_lt_v2 & v2_lt_v0)// vertex 2 (v2) is the minimum vertex
    reorder_vertices (v2'=v1, v1'=v0, v0'=v2,);
else if (~v0_lt_v1 & v1_lt_v2)// vertex 1 (v1) is the minimum vertex
    reorder_vertices (v2'=v0, v1'=v2, v0'=v1);
else // vertex 0 (v0) is the minimum vertex
    reorder_vertices (v2'=v2, v1'=v1, v0'=v0);

In the above algorithm, the function reorder_vertices ( ) performs the assignments or swaps needed to change the vertex order.

Figure 4A:
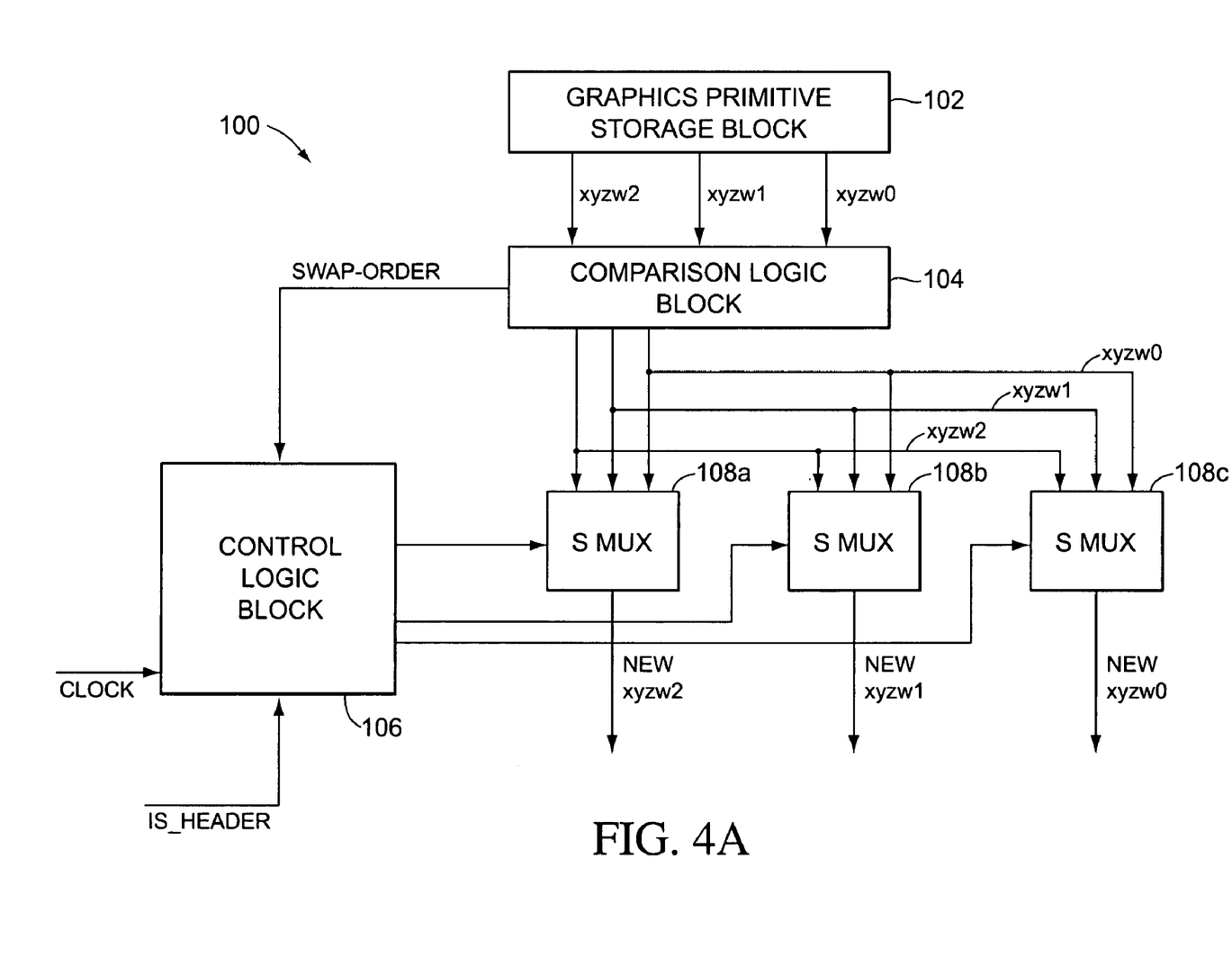
FIG. 4A shows a block diagram of an apparatus in accordance with the present invention.

FIG. 4A shows a block diagram 100 of an apparatus in accordance with the present invention. The apparatus includes a graphics primitive storage block 102 that supplies the vertex coordinates (header data), which may be homogenous coordinates in some versions, a comparison logic block 104 that implements the above algorithm and supplies a swap_order bit field, control logic 106 and three 3:1 multiplexers 108a–c, each of which receives all three vertices. The control logic block 106 is operative to control the selection inputs of the three multiplexers 108a–c to perform the reordering.

Figure 4B:
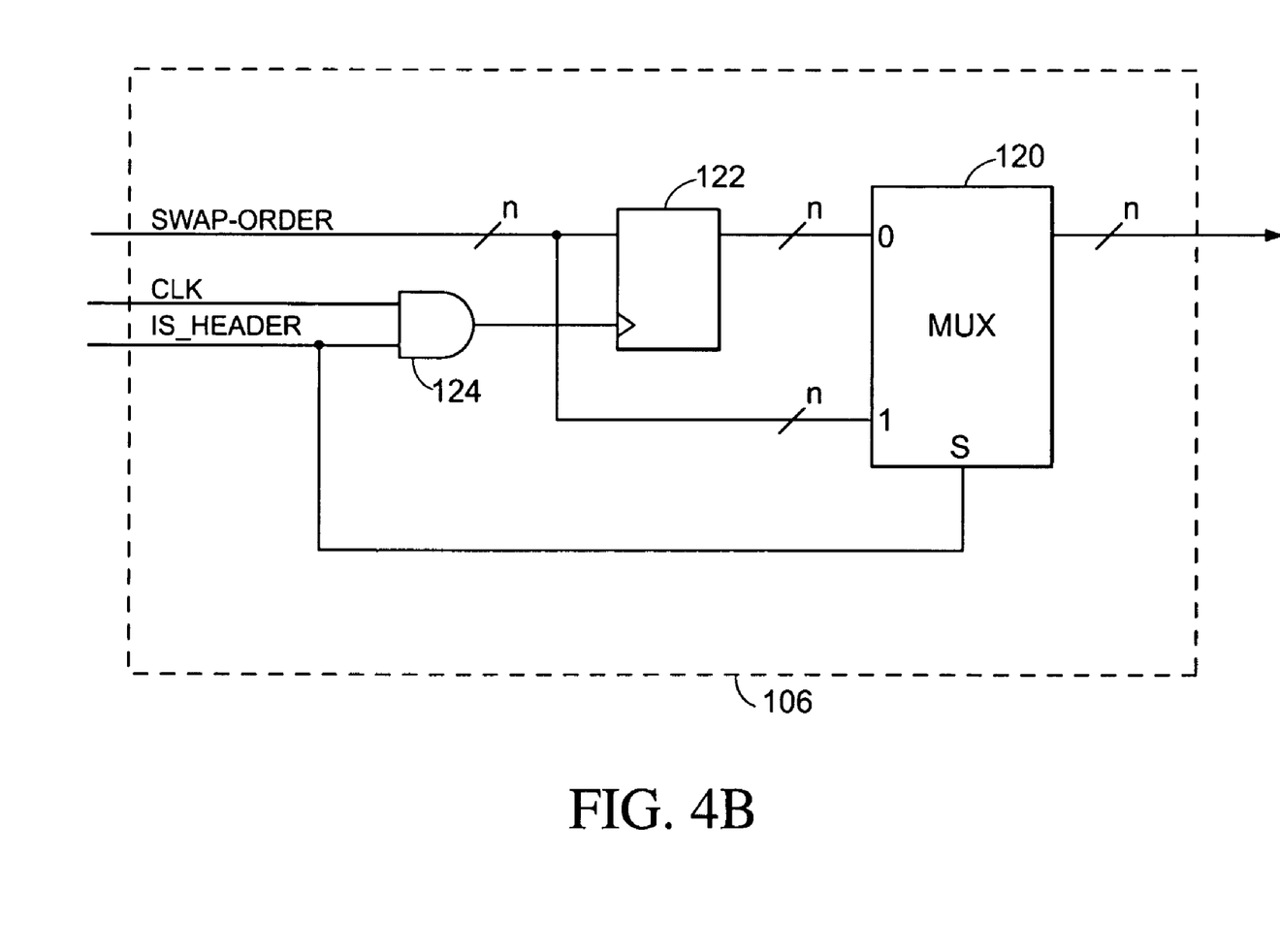
FIG. 4B shows a block diagram of the control logic block in one version of the invention.

Referring to FIG. 4B, the control logic block 106 includes a 2:1 multiplexer 120, a register 122 and a gate 124. The selection input of the 2:1 multiplexer 120 receives a signal called is_header, which indicates that coordinate information for the vertices of a graphics primitive is available from the triangle parameters block. When is_header is true, the 2:1 multiplexer 120 passes the swap_order bit field through to the selection inputs of the 3:1 multiplexers. At the same time, the register 122, via the gate 124, stores the swap_order bit field, so that when is_header is not true, the reordering information is preserved, allowing other triangle parameter data to pass through the multiplexers according to the same ordering as was established when the header data passed through.

The swap_order bit field is a 6 bit field. Each pair of bits in the bit field is configured to operate a pair of selection inputs of one of the 3:1 multiplexers. Binary value b'00, selects the lowest order input, binary b'01, selects the middle input and binary b'10 selects the highest order input. For convenience, each of the 3:1 multiplexers receives the vertex coordinates on its inputs in the same fashion, i.e., with v0 at the lowest order position, v1 in the middle position and v2 in the highest order position.

Therefore, the function reorder_vertices (v2'=v1, v1'=v0, v0'=v2) can be implemented by assigning a value (01,00,10) to the swap_order bit field. The lower two bits b'10 cause v0'=v2, the middle two bits b'00 cause v1'=v0 and the upper two bits b'01 cause v2'=v1. For reorder_vertices (v2'=v0, v1'=v2, v0'=v1) the swap_order bit field is (00,10,01) and for reorder_vertices (v2'=v2, v1'=v1, v0'=v0) the swap_order bit field is (10,01,00), which preserves the current order.

FIGS. 5A–D show a flow chart of an embodiment of a method of the present invention. In step 200 of FIG. 5A, a plurality of vertices of a graphics primitive is received. Next, in step 202, the minimum vertex, i.e., the one closest to the origin is determined. In step 204, the minimum vertex is moved to a first predefined position in the circular ordering, and in loop 206, 208, 210 each next vertex is moved to a next predefined location in the ordering.

Figure 5A:
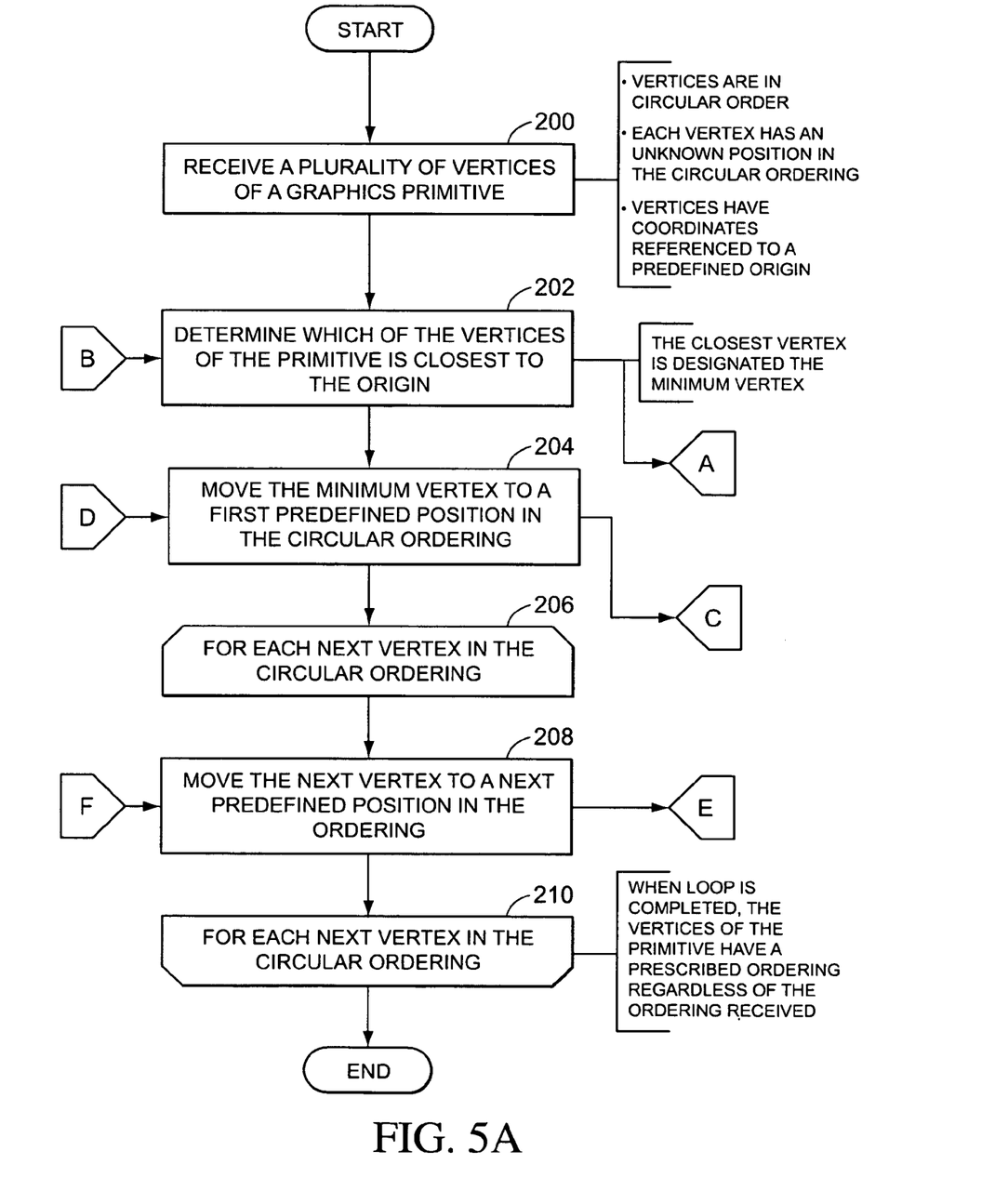
FIGS. 5A–D show a flow chart of an embodiment of a method of the present invention.
Figure 5B:
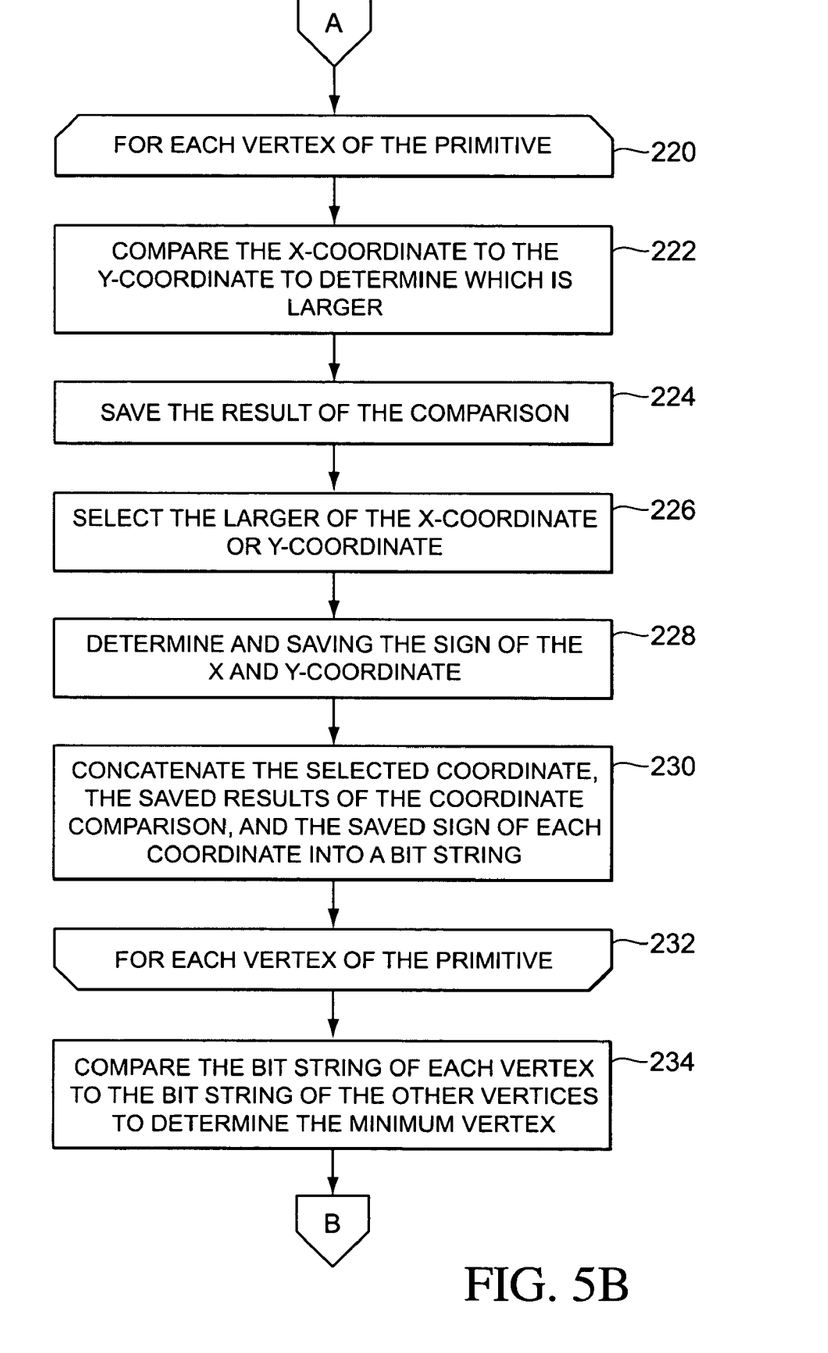

FIG. 5B shows the steps for determining the minimum vertex. For each vertex of the primitive as determine by loop 220, 232, the x-coordinate is compared, in step 222, to the y-coordinate to determine which is the larger coordinate. The result of the comparison is saved in step 224. Next, in step 226, the larger of the two coordinates is selected. In step 228, the sign of the x- and y-coordinates are determined and saved. In step 230, the selected coordinate, the saved results of the coordinate comparison, and the saved signs of each coordinate are concatenated. In step 234, with all of the concatenations available, the bit string of each vertex is compared to the bit string of the other vertices to determine the minimum vertex.

Figure 5C:
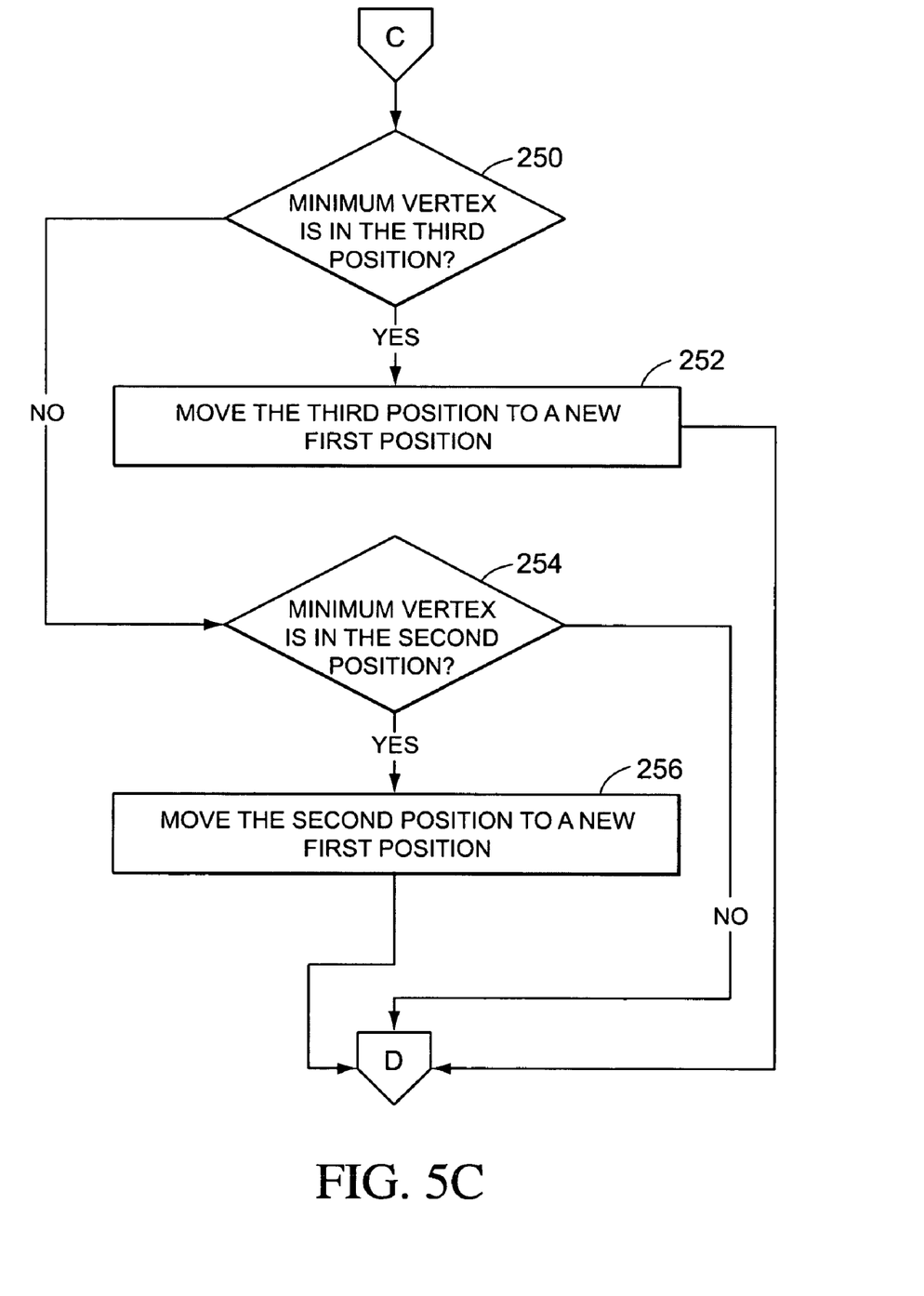

FIG. 5C shows the steps for moving the minimum vertex to a first predefined position in the circular ordering. Assuming there are three vertices, if the minimum vertex is in the third position, as determined in step 250, then the third position is moved, in step 252, to a new first position in the circular order. If the minimum vertex is in the second position, as determined in step 254, then the second position is moved to a new first position in step 256.

Figure 5D:
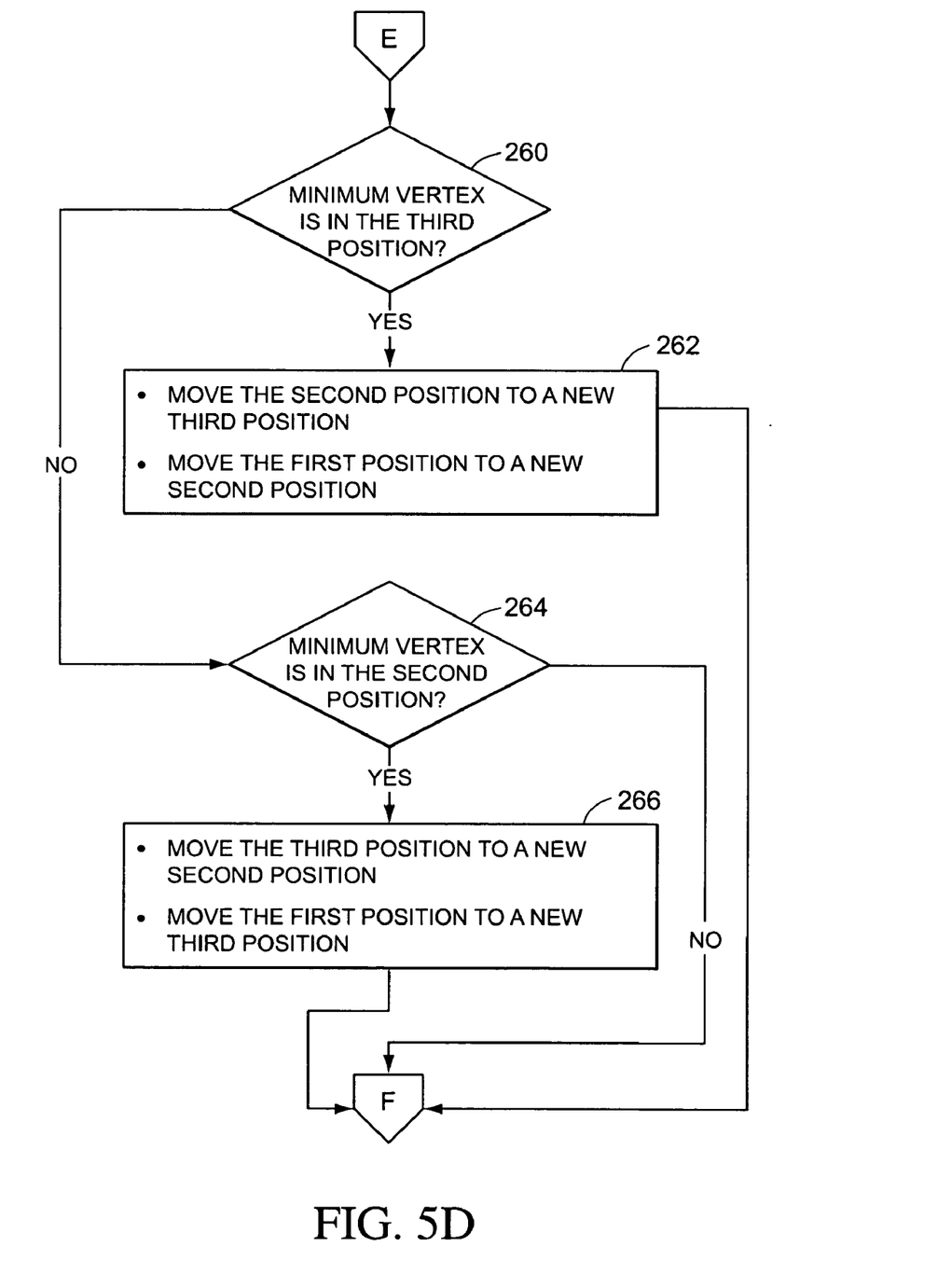

FIG. 5D shows the steps for moving each next vertex to a next predefined position in the circular ordering. Assuming there are three vertices, if the minimum vertex is in the third position, as determined in step 260, the vertex in the second position is moved to a new third position and the vertex in the first position is moved to a new second position, in step 262. If the minimum vertex is in the second position, as determined in step 264, then the vertex in the third position is moved to a new second position, and the vertex in the first position is moved to a new third position, in step 266.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of reordering vertices of a graphics primitive, comprising:
   receiving a plurality of vertices of a graphics primitive, the vertices having a circular ordering, each vertex having an unknown position in the circular ordering and including coordinates with respect to a predefined origin;
   determining which of the vertices of the primitive is closest to the origin, the closest vertex being designated the minimum vertex;
   moving the minimum vertex to a first predefined position in the circular ordering; and
   for each next vertex in the circular ordering, moving the next vertex to a next predefined position in the circular ordering so that the vertices of the primitive have a prescribed ordering regardless of the order received.

2. A method of reordering vertices as recited in claim 1, wherein each vertex has an x-coordinate and a y-coordinate; and
   wherein the step of determining which of the vertices of the primitive is closest to the origin includes:
   for each vertex of the primitive, comparing the x-coordinate to the y-coordinate to determine which is larger, saving the result of the comparison, selecting the larger of the x-coordinate or y-coordinate, determining and saving the sign of the x and y-coordinate, and concatenating the selected coordinate, the saved results of the coordinate comparison, and the saved sign of each coordinate into to a bit string; and
   comparing the bit string of each vertex to the bit strings of the other vertices to determine the minimum vertex.

3. A method of reordering vertices as recited in claim 1, wherein the primitive has three vertices and each vertex has an x-coordinate and a y-coordinate; and
   wherein the step of determining which of the vertices of the primitive is closest to the origin includes:
   for each vertex of the primitive, comparing the x-coordinate to the y-coordinate to determine which is larger, saving the result of the comparison, selecting the larger of the x-coordinate or y-coordinate, determining and saving the sign of the x and y-coordinate, and concatenating the selected coordinate, the saved results of the coordinate comparison, and the saved sign of each coordinate into to a bit string; and
   comparing the bit string of the first vertex to the bit string of the second vertex, the bit string of the second vertex to the bit string of the third vertex, and the bit string of the third vertex to the bit string of the first vertex to determine the minimum vertex.

4. A method of reordering vertices as recited in claim 1, wherein the primitive has three vertices having a circular ordering of first, second and third position; and
   wherein the step of moving the minimum vertex to a first predefined position in the circular ordering includes:
   if the position of the minimum vertex is the third position, moving the third position to a new first position, moving the second position to a new third position, moving the first position to a new second position; and
   if the position of the minimum vertex is the second position, moving the third position to a new second position, moving the second position to a new first position, and, moving the first position to a new third position.

5. A method of reordering vertices as recited in claim 1, wherein the prescribed circular ordering is counter-clockwise.

6. An apparatus for reordering vertices of a graphics primitive, the apparatus comprising:
   a graphics primitive storage block for storing a plurality of vertices of a graphics primitive, the vertices in the storage block having a circular ordering, each vertex having an unknown position in the circular ordering and including coordinates with respect to a predefined origin;
   a comparison logic block connected to receive the vertices stored in the graphics primitive storage block and configured to determine which of the vertices of the primitive is closest to the origin, the closest vertex being designated the minimum vertex, and to generate a swap_order bit field that contains instructions for reordering the vertices to prescribed positions in the circular ordering based on the determined minimum vertex;
   a plurality of multiplexers each connected to receive the plurality of vertices stored in the storage block, each multiplexer operative to select one of the plurality of vertices based on the swap_order bit field, such that the plurality of multiplexers provides on its output the reordered vertices of the primitive; and
   a control logic block connected to the comparison logic block and configured to receive the swap_order bit field, a header signal that indicates when the coordinates of the vertices are available from the storage block, and to distribute the swap_order bit field to the plurality of multiplexers to control the selection by the multiplexers.

7. An apparatus for reordering vertices of a graphics primitive as recited in claim 6, wherein the control logic block includes:
   a register connected to receive and store the swap_order bit field when the header signal indicates the coordinates of the vertices are available; and
   a multiplexer having a first input connected to the register, a second input connected to receive the swap_order bit field and a selection input connected to the header signal, such that, when the header signal indicates the coordinates of the vertices are available, the multiplexer distributes the received swap_order bit field to the plurality of multiplexers, and when the header signal indicates the coordinates are not available, the multiplexer distributes the stored swap_order bit field to the plurality of multiplexers.

8. An apparatus for reordering vertices of a graphics primitive as recited in claim 6, wherein the prescribed circular ordering is counter-clockwise.

9. A computer programmable medium having computer-executable instructions for performing a method comprising:
- receiving a plurality of vertices of a graphics primitive, the vertices having a circular ordering, each vertex having an unknown position in the circular ordering and including coordinates with respect to a predefined origin;
- determining which of the vertices of the primitive is closest to the origin, the closest vertex being designated the minimum vertex;
- moving the minimum vertex to a first predefined position in the circular ordering; and
- for each next vertex in the circular ordering, moving the next vertex to a next predefined position in the circular ordering so that the vertices of the primitive have a prescribed ordering regardless of the order received.

10. A computer programmable medium, as recited in claim 9,
- wherein each vertex has an x-coordinate and a y-coordinate; and
- wherein the step of determining which of the vertices of the primitive is closest to the origin includes:
  - for each vertex of the primitive, comparing the x-coordinate to the y-coordinate to determine which is larger, saving the result of the comparison, selecting the larger of the x-coordinate or y-coordinate, determining and saving the sign of the x and y-coordinate, and concatenating the selected coordinate, the saved results of the coordinate comparison, and the saved sign of each coordinate into to a bit string; and
  - comparing the bit string of each vertex to the bit strings of the other vertices to determine the minimum vertex.

11. A computer programmable medium, as recited in claim 9,
- wherein the primitive has three vertices and each vertex has an x-coordinate and a y-coordinate; and
- wherein the step of determining which of the vertices of the primitive is closest to the origin includes:
  - for each vertex of the primitive, comparing the x-coordinate to the y-coordinate to determine which is larger, saving the result of the comparison, selecting the larger of the x-coordinate or y-coordinate, determining and saving the sign of the x and y-coordinate, and concatenating the selected coordinate, the saved results of the coordinate comparison, and the saved sign of each coordinate into to a bit string; and
  - comparing the bit string of the first vertex to the bit string of the second vertex, the bit string of the second vertex to the bit string of the third vertex, and the bit string of the third vertex to the bit string of the first vertex to determine the minimum vertex.

12. A computer programmable medium, as recited in claim 9,
- wherein the primitive has three vertices having a circular ordering of first, second and third position; and
- wherein the step of moving the minimum vertex to a first predefined position in the circular ordering includes:
  - if the position of the minimum vertex is the third position, moving the third position to a new first position, moving the second position to a new third position, moving the first position to a new second position; and
  - if the position of the minimum vertex is the second position, moving the third position to a new second position, moving the second position to a new first position, and, moving the first position to a new third position.

13. An apparatus for reordering vertices of a graphics primitive, the apparatus comprising:
- means for storing a plurality of vertices of a graphics primitive, the vertices in the storage block having a circular ordering, each vertex having an unknown position in the circular ordering and including coordinates with respect to a predefined origin;
- means, connected to storing means, for determining which of the vertices of the primitive is closest to the origin, the closest vertex being designated the minimum vertex, and for generating a field that contains instructions for reordering the vertices to prescribed positions in the circular ordering based on the determined minimum vertex; and
- means, connected to the determining means, for reordering the vertices based on the instruction field.

14. An apparatus for reordering vertices as recited in claim 13, wherein the determining means includes a comparison logic block that is connected to receive the vertices stored in the graphics primitive storage block and generates the field that contains the instructions for reordering the vertices.

15. An apparatus for reordering vertices as recited in claim 13, wherein the reordering means includes a plurality of multiplexers each connected to receive the plurality of vertices stored in the storage block, each multiplexer operative to select one of the plurality of vertices based on the instruction field, such that the plurality of multiplexers provides on its output the reordered vertices of the primitive.

* * * * *